United States Patent [19]
Li et al.

[11] Patent Number: 5,872,896
[45] Date of Patent: Feb. 16, 1999

[54] CONTINUOUS-TONE INK REDUCTION

[75] Inventors: Chia-Hsin Li; Joseph S. Shu, both of San Jose, Calif.

[73] Assignee: Seiko Epson Corporation, Tokyo, Japan

[21] Appl. No.: 679,422

[22] Filed: Jul. 8, 1996

[51] Int. Cl.⁶ .............................. B41B 15/00; H04N 1/21; B41J 29/38; G06K 9/00
[52] U.S. Cl. .......................... 395/109; 395/109; 395/117; 395/101; 358/296; 358/518; 347/15; 347/43; 347/5; 382/162
[58] Field of Search ............................ 395/109; 382/162; 347/43, 5, 15, 9; 358/296, 298, 518

[56] References Cited

U.S. PATENT DOCUMENTS

| | | |
|---|---|---|
| 5,196,056 | 3/1993 | Prasad . |
| 5,353,387 | 10/1994 | Petschik et al. . |
| 5,384,585 | 1/1995 | Okumura . |
| 5,439,515 | 8/1995 | Kurabayashi et al. . |
| 5,461,403 | 10/1995 | Wallace et al. . |
| 5,563,985 | 10/1996 | Klassen et al. ........................ 395/109 |
| 5,633,662 | 5/1997 | Allen et al. ................................ 347/15 |

*Primary Examiner*—Edward L. Coles
*Assistant Examiner*—Twyler Lamb
*Attorney, Agent, or Firm*—Mark P. Watson

[57] ABSTRACT

An ink-jet-printer driver employs clustered-dot dither to generate binary image signals that represent an image that has been adjusted for the ink-duty limit that must be imposed to avoid bleeding on some print media. Some image values that would result in ink duties that exceed the limit without adjustment are actually reduced by more than needed to meet the ink-duty limit. The resultant adjusted value is an increasing function of unadjusted value even for unadjusted values that exceed the ink-duty limit. To impose the limit, a Bayer dither process (94) receives an input that represents the ratio of ink-limit-adjusted ink duty to unadjusted ink duty. A gating operation (96) permits an ink request only at those locations where both dither processes (92 and 94) indicate that an ink is permitted.

40 Claims, 9 Drawing Sheets

CONTINUOUS-TONE INK REDUCTION

BACKGROUND OF THE INVENTION

The present invention is directed to ink-jet printers and in particular to mechanisms for controlling the ink duty.

A digitally expressed color image is quite often stored or expressed as three-dimensional values of picture elements ("pixels") that in combination make up the image. The pixel value represents a location in a color space. Most typically, that color space is the red-green-blue color space or, complementarily, the cyan-magenta-yellow color space. That is, the vector components respectively represent red, green, and blue or cyan, magenta, and yellow. Other color spaces are used less frequently.

Most imaging systems express the pixel-value components with a relatively high resolution, such as eight bits per pixel, at some point in the processing. In such a case, each component can have a value between 0 and 255 ($2^8-1=255$). In contrast, although some printers do apply ink dots of different sizes, most apply only single-sized dots, so the control for a given color component is binary: the dot is either applied or not at any given pixel location. The higher intensity resolution of the original pixel values is simulated by half-toning, in which different intensities are achieved by applying dots in different percentages of the pixels. If the component-value range is 255, and the value of a particular component is 255 throughout a region, then all pixels in that region receive a dot of the ink whose color is associated with that component. If the component value is 128, on the other hand, only 128 out of every 255 pixels receive ink of that color.

In "ordered dither"-type half-toning, for instance, thresholds of a "dither matrix" are associated with respective display-medium pixel locations, and the printer deposits ink on those locations at which the component value equals or exceeds the associated matrix threshold. So if the matrix consists of threshold values more or less evenly distributed throughout a range, a component value in the middle of the range is likely to result in dots' being deposited at approximately half of the pixel locations, whereas a component value at the top of the range is deposited in all locations: the ink duty is 100%.

The form in which the image typically is stored electronically represents quantities of ideal color components, which real-world inks do not match exactly. Moreover, ink-dot geometry is such that color darkness does not increase linearly with the ink's duty cycle. So it is a feature of some printer drivers that they adjust the image-representing signals to compensate for these limitations and produce signals that specify the ink duties that would match the ideal image with the greatest fidelity.

But the medium on which the image is printed unfortunately imposes further limitations in some cases. In particular, the high ink duties that would produce the darkest requested colors most faithfully would cause ink "bleeding" on some types of paper and other media. Coated types of paper are typically subject to such bleeding, and transparencies often are similarly afflicted. So the printer driver must additionally impose an ink-duty limit, which necessarily compromises image fidelity. This compromise is unavoidable: there is no way in which a limited ink duty can result in as faithful a reproduction of the darkest colors as ink duties can that are not so limited. So it would seem that the best that can be done for unadjusted ink duties that exceed a given medium's ink-duty limit is to print them with the limit value and thus obtain a darkness as great as the medium's limitations permit.

SUMMARY OF THE INVENTION

But we have found that a superior image can actually be obtained by reducing some such ink-duty-limit-exceeding unadjusted values by more than is necessary to meet the limit. For example, we reduce an unadjusted value that just meets the limit to a value significantly below the limit so that the adjusted value, as a function of unadjusted value, can continue to increase for limit-exceeding unadjusted values and still not itself exceed the ink-duty limit.

The beneficial result is that darkness variations among unadjusted values that exceed the ink-duty limit are reflected in variations among the corresponding adjusted values. So even though reducing the ink duty by more than the medium's ink-duty limit requires would seem to exact an unnecessary fidelity loss, we actually reduce the loss of image information that otherwise would result.

We prefer to make the adjustment in a hue-preserving manner. Specifically, if the highest-value component of a given pixel value has to be reduced in order to prevent the corresponding ink's duty from exceeding the medium's duty-cycle limit, the other two components' values should be reduced proportionately, even though they would meet the ink-duty limitation without such a reduction.

BRIEF DESCRIPTION OF THE DRAWINGS

The invention discussion below refers to the accompanying drawings, of which.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included within a printer that receives instructions in terms of nominal colors or gray-scale values, and the dedicated circuitry can be designed to convert the requested values to values that will comply with prescribed ink-duty limits. But the invention will more typically be implemented by a general-purpose machine, such as a personal computer operating as a printer driver, whose purpose is to convert an image expressed in nominal color values into printer commands that comply with specified printer- and medium-dependent limitations.

Figure 1:
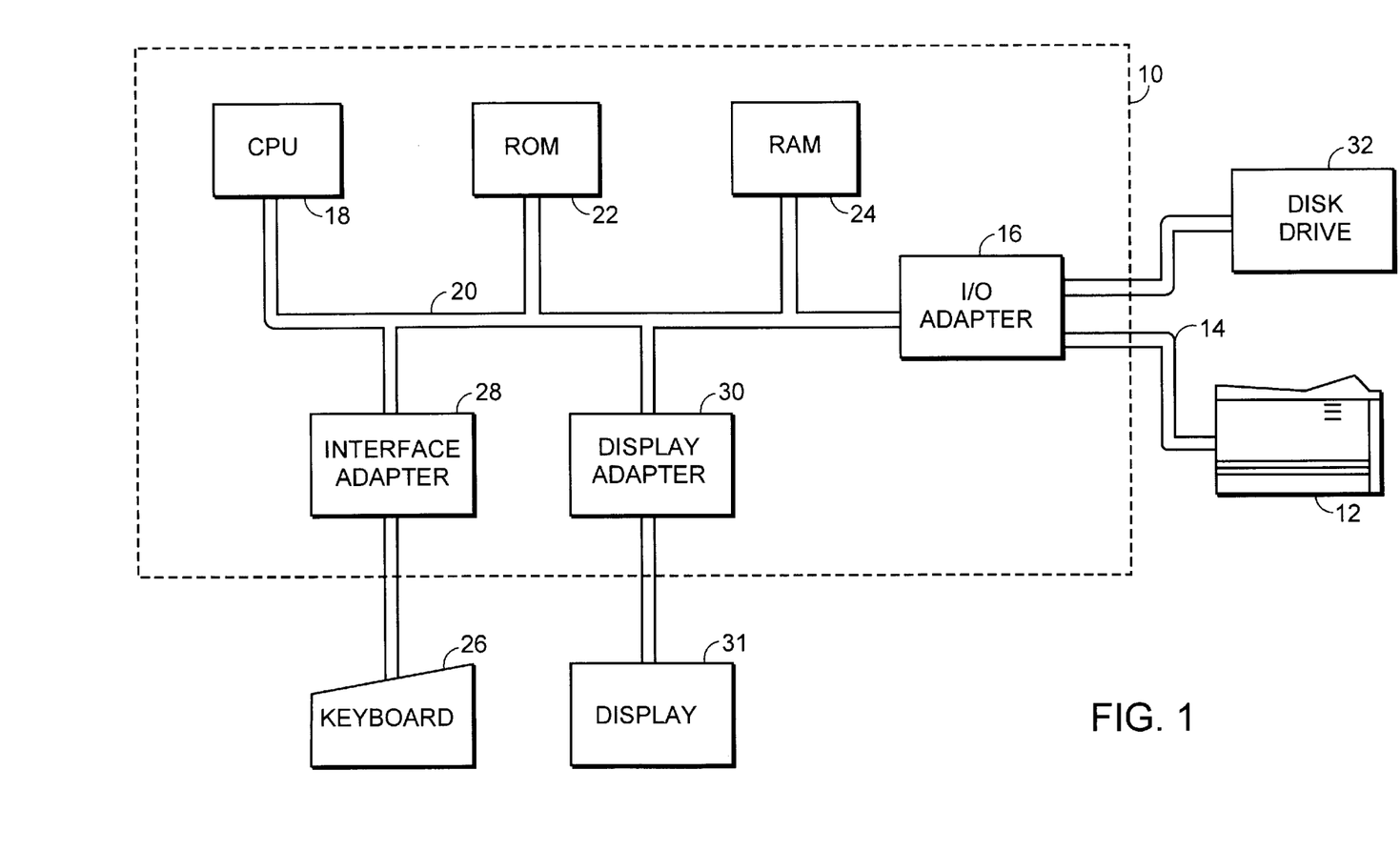
FIG. 1 is a hardware-perspective block diagram of a computer system of the type in which the present invention's teachings will most typically be practiced.

FIG. 1 depicts a typical hardware environment. A personal computer 10 sends a display device such as an ink-jet printer 12 low-level instructions, i.e., instructions that specify which individual display-medium pixels should receive dots. The drawing depicts the printer 12 as receiving these instructions by way of an appropriate channel 14. Computers that can embody the present invention come in a wide variety of configurations, and FIG. 1 depicts one in which channel 14 is provided by an input-output adapter 16 with which a central processing unit 18 communicates by way of an internal bus 20.

Of course, the central processing unit 18 typically fetches data and instructions at various times from a variety of sources, such as solid-state read-only and read-write memories 22 and 24. FIG. 1 depicts the computer 10 as also communicating with the usual keyboard 26 by way of an interface adapter 28. And a display adapter 30 usually couples a cathode-ray-tube display 30 is to the central processing unit 18.

The computer 10 typically implements the present invention's teachings when it functions as a printer driver. Operating-system software transferred to the computer's disc drive 32 and stored in a disc that the drive contains usually includes instructions that configure the computer to perform this function. The driver software will often have been loaded into the computer system from another storage medium, such as a diskette or CD-ROM. In any event, the computer 10 reads the printer-driver instructions from the disc drive in most cases and then performs the below-described functions to implement the present invention's teachings.

Figure 2:
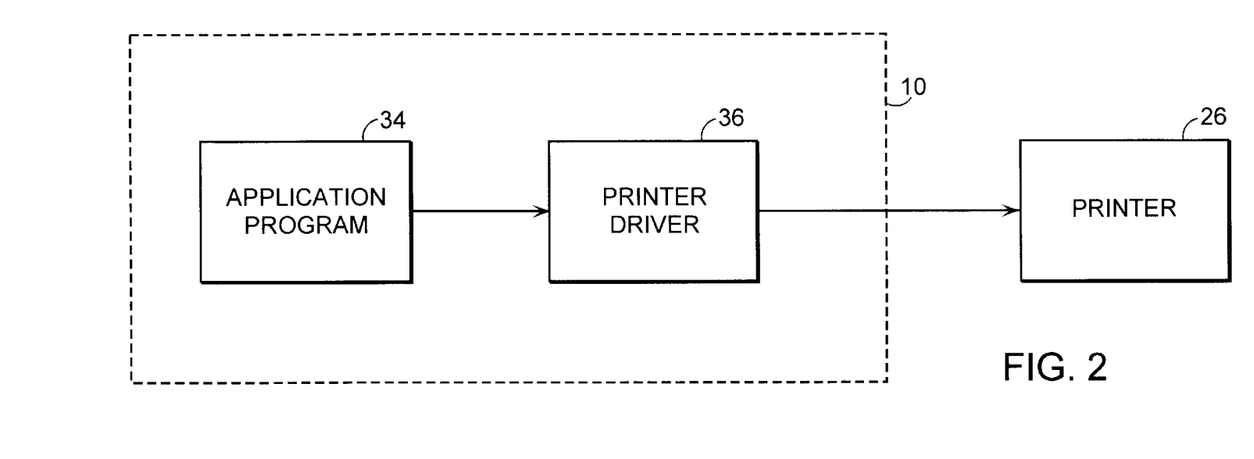
FIG. 2 is a software-perspective block diagram of the same environment.

FIG. 2 depicts the invention's environment from more of a software standpoint. The present invention's teachings usually come into play when the computer 10 is operating a user's application program 34 and that program makes a system call requesting that an image be printed. A printer driver 36, which is usually considered to be part of the operating system but is specific to the designated printer, performs the requested operation. The printer driver's purpose is to convert a device-independent representation of the image into low-level printer instructions that will cause the printer 26 to render that image as faithfully as the printer's limitations permit.

Figure 3:
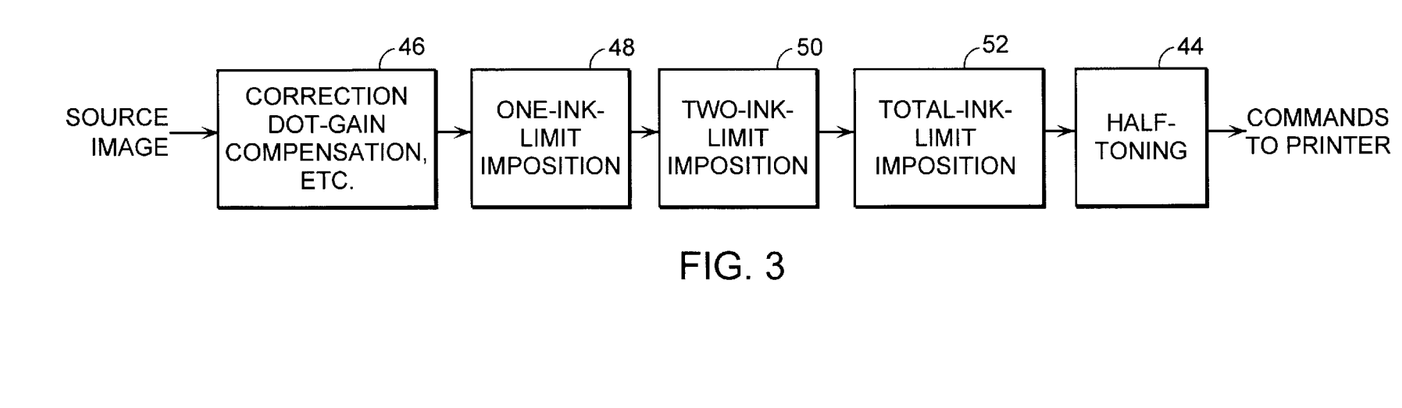
FIG. 3 is a high-level block diagram of the image-revision sequence used in generating printer instructions.

FIG. 3 depicts the printer-driver functions most relevant to the present invention. The driver typically performs such functions after a number of other image-revision operations 46. One such preliminary operation is adjusting the color-component values to compensate for departures of the component inks' actual colors from the ideal. Another typical preliminary step is to perform dot-gain compensation, i.e., compensation for nonlinearities in the relationship between color darkness and the percentage of pixels that receive ink dots. It is most common to employ look-up tables to implement some of these functions, but algorithm-based adjustments may be employed instead of or in conjunction with table-look-up operations.

We will assume that the output of the initial processing stages 46 is a pixel value (C, M, Y) whose components represent cyan, magenta, and yellow, i.e., the three ink colors. This assumption is convenient for the purposes of the following development, but those skilled in the art will recognize that systems expressing pixel values, as, say, locations in the red-green-blue or some other color space can also employ the present invention's teachings. If the driver performs block 46's processing optimally, the resultant outputs are the ones that would result in the maximum color fidelity achievable with the particular printing hardware employed. But this fidelity must be compromised for some media if bleeding is to be avoided.

To this end, the driver so adjusts the maximum-fidelity pixel values as to place a limit on the quantity of ink actually deposited. FIG. 3 depicts three separate processes 48, 50, and 52 for respectively imposing one-ink, two-ink, and total-ink limits, although most of the invention embodiments will not impose all three. In the illustrated embodiments, the adjustments to the pixel values are all made in a hue-preserving manner:

$$\begin{bmatrix} C_{out} \\ M_{out} \\ Y_{out} \end{bmatrix} = s \cdot \begin{bmatrix} C_{in} \\ M_{in} \\ Y_{in} \end{bmatrix}, \qquad (1)$$

where the right and left vectors are the pixel values before and after the ink-limit imposition and s is a scalar that may be a function of the ink-limiting operation's input. For the one-ink-limit imposition, we prefer simply to make $s=l_1$, where $l_1$ is the one-ink duty limit. For instance, that limit could be 0.9, which would mean that ink of any given color could be deposited, at most, only in nine out of every ten pixels.

The simple proportionality of equation (1) means that the one-ink-limit-imposition operation reduces all input pixel values, regardless of how light the colors are that they specify. Of course, compliance with the one-ink limit does not require reducing the lighter colors' values, and one can instead employ a function that reduces only the darker colors.

Figure 4:
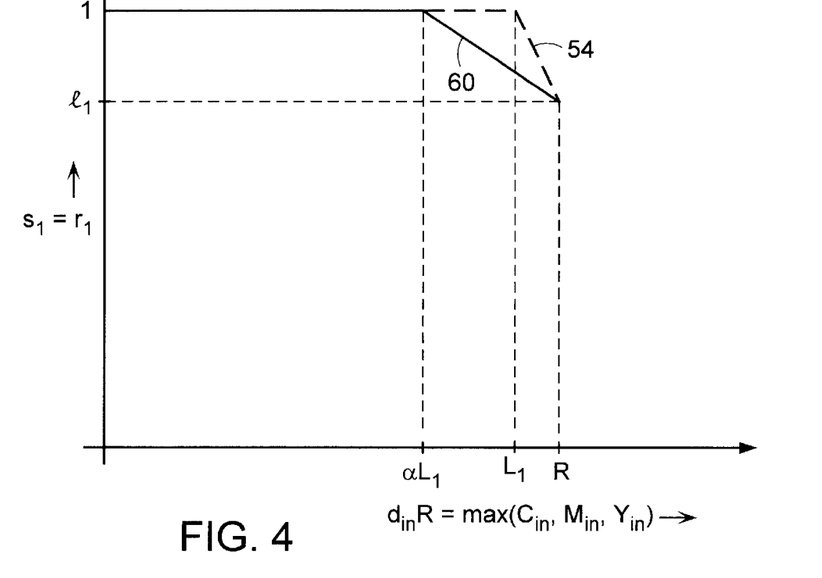
FIG. 4 is a plot of the ratio of output component value to input component value as a function of the maximum input component value in a single-ink-limiting operation of the present invention.

For example, FIG. 4 is a graph of the one-ink-limit operation's component-value ratio $s_1$ as such a function of the input pixel value's highest component value. (The drawing includes the legend "$s_1=r_1$," which indicates that the one-ink-limit operation's component-value ratio $s_1$ equals its ink-duty ratio $r_1$. The reason for making this distinction will become apparent below.) In FIG. 4, we assume a component-value range of zero to R, where R is typically 255, since the component values ordinarily are expressed with eight-bit resolution ($255=2^8-1$). To abide by a limit of $l_1$, any component value greater than $L_1=l_1R$ has to be adjusted downward. Since we prefer to preserve hue, this means that all component values of a pixel value whose maximum component exceeds $L_1$ must be proportionately reduced.

Figure 5:
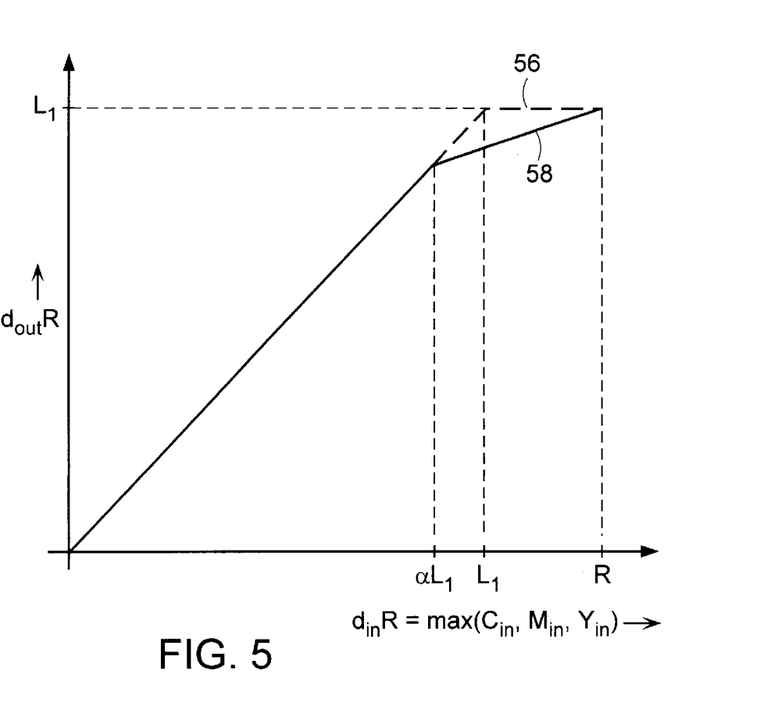
FIG. 5 is a plot of the resultant maximum output component value as a function of maximum input component value.

Dashed-line plot 54 represents the component-value ratio that yields the minimum requisite reduction. But the plot-54 function would result in equal output values for all input values of the same hue whose highest component exceeds $L_1$, so all of the input-value resolution between $L_1$ and R would be lost, as FIG. 5 illustrates. FIG. 5 plots the value of the highest output component as a function of the highest input component, and the dashed-line plot 56 illustrates the results of employing the ratio that FIG. 4's plot 54 represents.

To avoid this much resolution loss, we instead employ the relationship between input and output duty that FIG. 5's solid-line plot 58 represents. This can be achieved by simply setting the component-value ratio $s_1$ equal to the desired ratio $r_1$ of output duty to input duty. FIG. 4's solid-line plot 60 represents this $s_1$ function, which has a more gradual downward slope. And instead of beginning at $L_1$, the downward slope begins at $\alpha L_1$, where $\alpha<1$ may have a value of, say, 0.9.

Although algorithmic approaches to calculating FIG. 4's values in real time will readily suggest themselves, speed considerations will ordinarily dictate that the driver obtain the desired component-value ratio from a look-up table addressed by maximum unadjusted component value.

Figure 6:
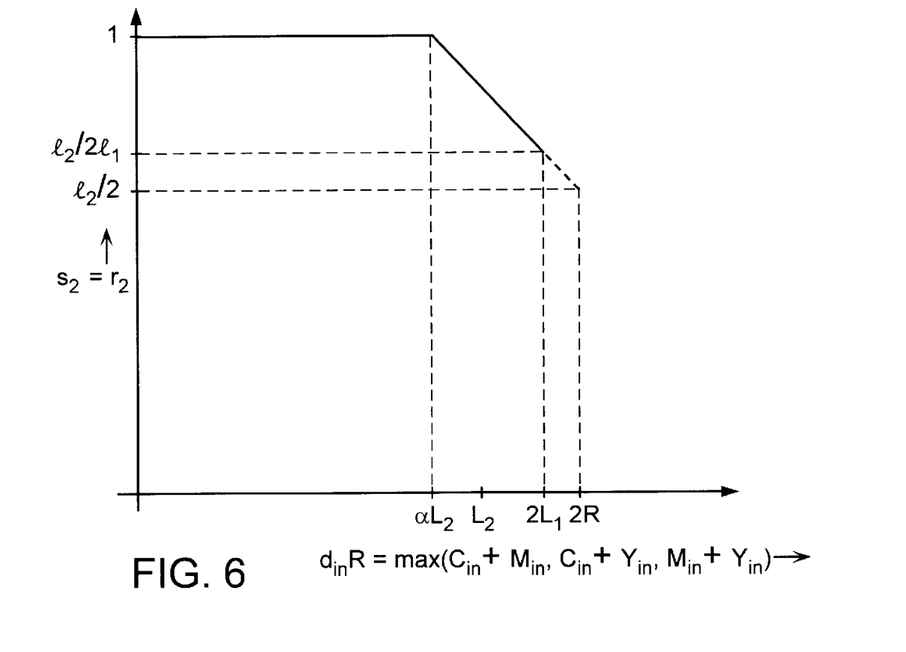
FIG. 6 is a plot similar to FIG. 4 for a two-ink-limiting process employed in some of the present invention's embodiments.

Having imposed a single-ink duty limit, the driver may additionally need to impose a two-ink duty limit. FIG. 6 shows that the component-ratio function for the two-ink duty-limit process is similar to the one depicted in FIG. 4 for the single-ink process, but it is based on a different computation of ink duty. Single-ink duty, of course, is simply the ratio of a given component value to the component-value range R. The two-ink duties are the ratios of two-component sums to the component-value range R. FIG. 6 is a plot of the two-ink-limit operation's component-value ratio $S_2$ as a function of those two-component sums' maximum value. For FIG. 3's image-revision sequence, in which a single-ink-limiting operation precedes the two-ink-limiting procedure, the function's domain extends only to twice single-ink-limit-imposed the maximum, or $2L_1$, not to $2R$, i.e., not to twice the value that a single component value's resolution permits. So the ratio $s_2$ of the two-ink-limit operation's output to its input has a minimum value of $l_2/2l_1$, rather than $l_2/2$, as it would if the one-ink-limit operation had not already been performed.

Also, $s_2$ begins decreasing at $\alpha L_2$. If the single-ink-limit operation were to be performed after the two-ink-limit operation, as it is in certain of the invention's embodiments, $s_2$ would instead remain at unity until the two-ink duty reached $\alpha l_2/l_1$ and would then slope downward to a minimum of $l_2/l_1$: the two-ink-limit operation would result in values that themselves do not necessarily meet the two-ink limit but that result, after the subsequent one-ink-limit operation, in values that do.

Figure 7:
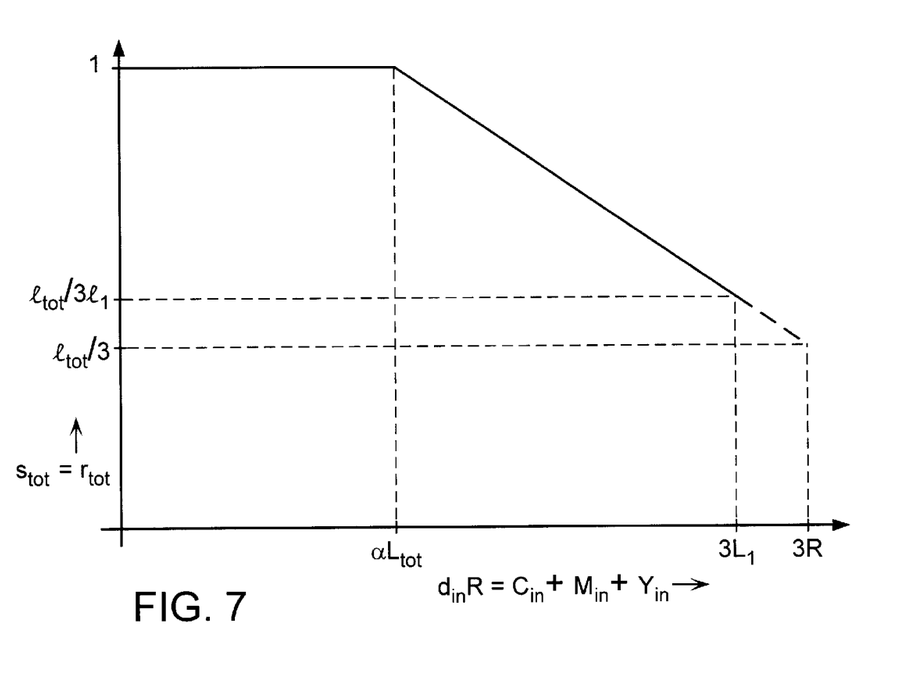
FIG. 7 is a similar plot for a total-ink-limiting operation in some of the invention's embodiments.

FIG. 7 shows that the total-ink-limit operation's component ratio $S_{tot}$ is a similar function, but its argument is total-ink duty rather than two-ink duty. FIG. 7 depicts the function's domain as extending to $3L_1$ so that the minimum component-value ratio can be $l_{tot}/3l_1$. This is based on the assumption that the one-ink-limiting operation precedes the two-ink-limiting operation. If a preceding two-ink-limiting operation imposes a limit $l_2<2l_1$, the minimum $s_2$ value can be raised to $2l_{tot}/3l_2$.

The formulas that the drawings give for the two-ink and total-ink duties are based on the assumption that the printer uses only three inks, namely, cyan, magenta, and yellow. But many printers additionally use black ink, and its use results in different ink duties and thus different values for the output-to-input ratio s. To understand the manner in which we accommodate such systems, consider the undercolor-removal process. In this process a four-element value (C–U, M–U, Y–U, K) replaces (C, M, Y) just before half-toning. Here K represents a black value and U is an undercolor-removal value, typically equal to K.

Figure 8:
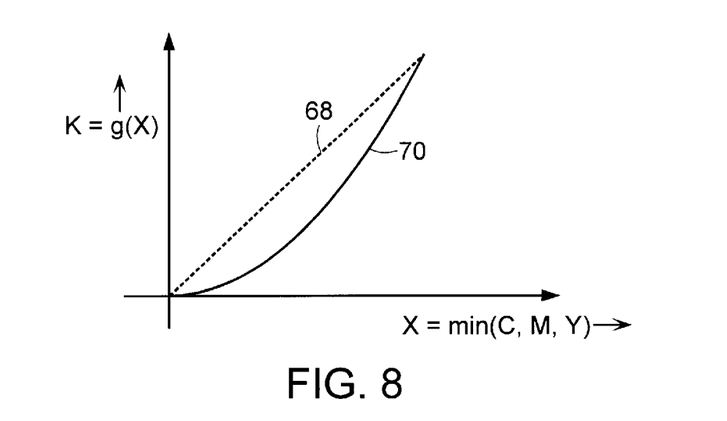
FIG. 8 is a graph containing two typical plots of black component value as a function of the other components' pre-undercolor-removal minimum.

FIG. 8 includes two plots 68 and 70 that represent typical relationships of the black value K to the value of (C, M, Y) before undercolor removal. Plot 68 represents the more-common relationship, where the black value K is equal to the minimum of the unadjusted pixel value's components. This is employed in the typical situation, in which black ink replaces the other three colors in all locations in which those other three colors would otherwise coincide.

When such a mode of undercolor removal will follow the ink-duty-limit impositions, the component-value ratio s is determined essentially as the above-described functions of the unadjusted ink duty. The only difference is the way in which that duty $d_{in}$ is computed.

For a one-ink-limiting operation, the printer driver multiplies the input component values by the ratio $s_1$ obtained from the FIG. 4 plot, but with $$d_{in}R = \max(V_B, V_T, V_B),$$

where $$V_B = \min(C_{in}, M_{in}, Y_{in})$$

and $$V_T = \max(C_{in}, M_{in}, Y_{in}).$$

A two-ink-limiting operation employs the FIG. 6 function, but with $$d_{in}R = \max(V_T, V_T + V_M - 2V_B),$$

where $$V_M = \mathrm{mid}(C_{in}, M_{in}, Y_{in}).$$

A total-ink-limiting operation can employ the FIG. 7 function with $$d_{in}R = V_T + V_M - V_B.$$

But since $d_{in}R \leq 2L_1$ in a CMYK process, it would be preferable to modify the FIG. 7 function so that its plot ends at $(2L_1, l_{tot}/2l_1)$.

In all of the embodiments described so far, the component-value ratio s is simply the ratio r of desired output ink duty to the input ink duty that it replaces. But if the undercolor-removal process's relationship of black to the other components is nonlinear as in FIG. 8's plot 70, such a value will not result in the desired output ink duty. So to find a component-value ratio s that yields duty ratios such as those of FIGS. 4, 6, and 7, we employ an iterative process of the type that the FIG. 9 flow chart exemplifies. The FIG. 9 routine determines the total-ink limiting operation's component-value ratio $s_{tot}$, but routines for determining the one- and two-ink-duty-limit component ratios $s_1$ and $s_2$ are essentially the same except for their ink-duty definitions.

Figure 9:
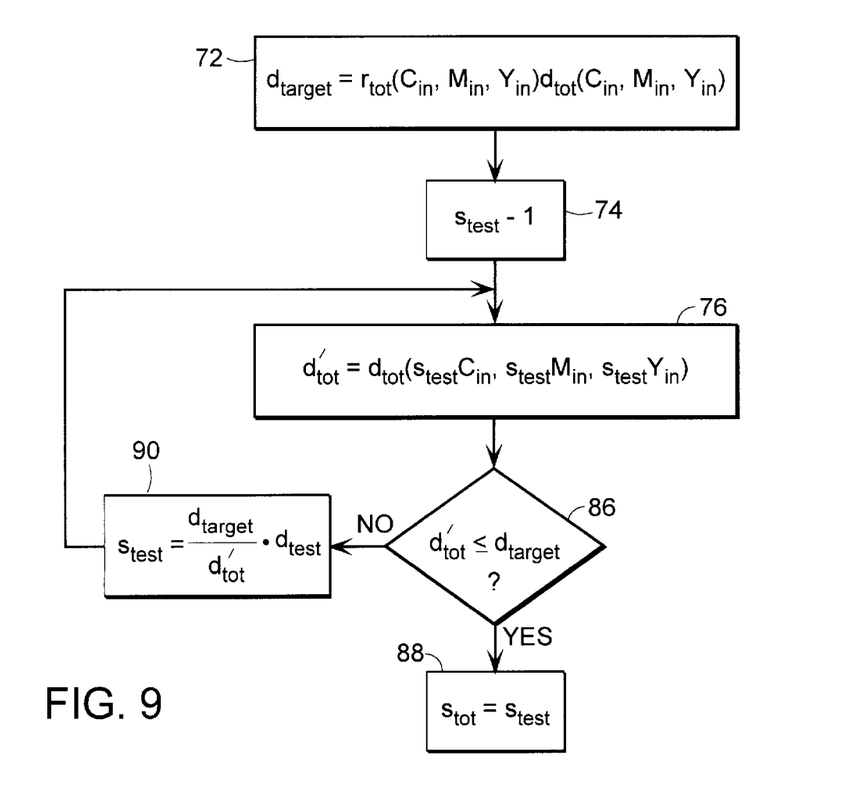
FIG. 9 is a flow chart that depicts the calculation of component-value ratios in some of the invention's embodiments.

FIG. 9's block 74 depicts the process of determining a target duty $d_{target}$ as a multiplication of FIG. 7's desired duty-cycle ratio $r_{tot}$ by the duty cycle that would result from the input pixel value ($C_{in}$, $M_{in}$, $Y_{in}$) after undercolor removal. In practice, one might employ a look-up table addressed by $d_{tot}$ that contains pre-calculated $d_{target}$ values. The way in which the routine takes the undercolor-removal operation into account in determining the total ink duty $d_{tot}$ will be described presently in connection with FIG. 10.

The FIG. 9 routine's purpose is to identify a component-value ratio $s_{tot}$ that will achieve this target duty $d_{target}$. To this end, the FIG. 9 routine employs a trial component-value ratio $s_{test}$, which it initially sets to unity in a step that block 74 represents. Block 76 represents then computing the total duty that results from multiplying the input component values by $s_{test}$.

Figure 10:
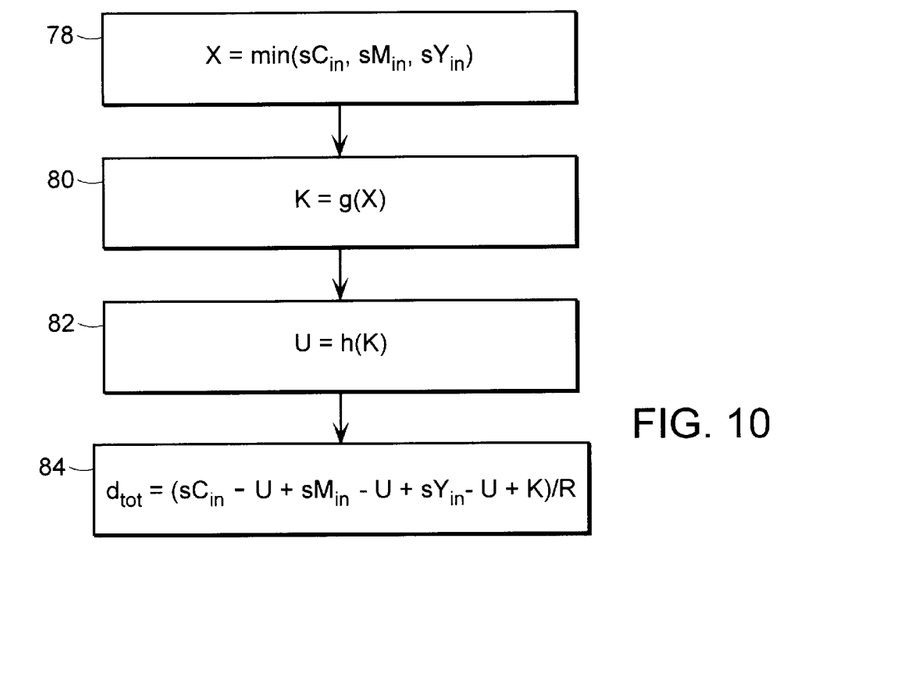
FIG. 10 is a flow chart that depicts one of FIG. 9's steps in greater detail.

FIG. 10 illustrates the total-ink-duty-computation routine that FIG. 9's steps 72 and 76 employ. FIG. 10's blocks 78 and 80 represent the fact that the black value K is based on the minimum of the three color components $sC_{in}$, $sM_{in}$, and $sY_{in}$, where s is unity for the $d_{tot}$ operation of FIG. 9's block 72 and $s=s_{test}$ for the $d_{tot}$ operation of FIG. 9's step 76. FIG. 8's plots 68 and 70 represent two typical g(X) functions that can be employed in FIG. 12's step 80 to determine the black-component value K, but the particular g(X) choice is not critical.

The purpose of the black value K, of course, is to specify how much black ink is to be deposited. And since a black dot is used in place of coincident dots of cyan, magenta, and yellow, an undercolor-removal value U to be subtracted from the cyan, magenta, and yellow components is determined from the black value K, as block 82 indicates. Block 82 is largely conceptual, because in most cases the undercolor value is the same as the black value.

Having determined the black and undercolor-removal values, the routine then computes the total ink duty $d_{tot}$ by adding the black value to the undercolor-adjusted cyan, magenta, and yellow values, as block 84 indicates. Since we have been referring in this discussion to the duty $d_{tot}$ as a ratio, block 84 includes a conceptual division by the component-value range R, but the actual computer procedure may scale some values by R to avoid such a division.

If the output total-ink duty $d'_{tot}$ computed in accordance with the FIG. 10 routine equals the target duty $d_{target}$, then the trial component-value ratio $s_{test}$ is the value required, and the FIG. 9 routine adopts it as the component-value ratio $s_{tot}$ to be used to compute the total-ink-limit operation's output component values, as FIG. 9's blocks 86 and 88 indicate. Otherwise, the FIG. 9 routine reduces the trial component-value ratio $s_{test}$ in accordance with the equation of block 90 and repeats steps 76 and 86 to determine whether the new trial component-value ratio results in the desired total-ink duty $d_{target}$. This process continues until the trial component-value ratio $s_{test}$ meets the block 86 criterion. Although it may seem that the FIG. 9 routine would only asymptotically approach the desired value, the necessarily finite precision with which the computer performs it usually results in convergence within only two or three iterations.

Figure 12:
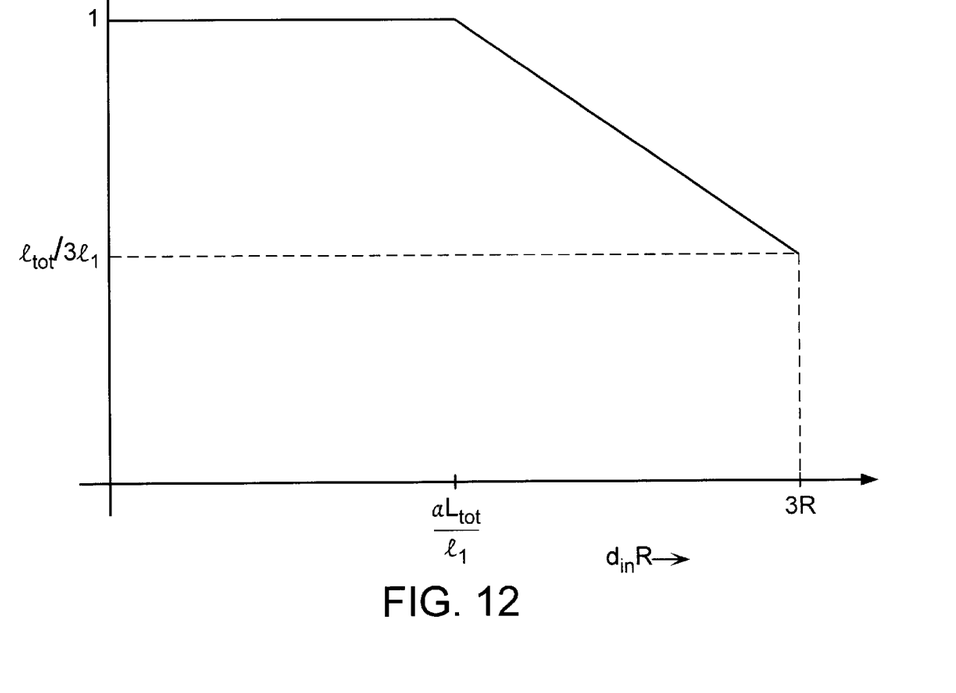
FIG. 12 is a component-ratio plot for the total-ink-reduction operation in the embodiments of FIG. 11.

A routine like the one in FIGS. 9 and 10 can also be used to determine the two-ink-limit operation's component ratio $s_2$. The only differences are that two-ink variables replace the total-ink variables and that the total-ink-duty computation of FIG. 12's block 84 is replaced with the following two-ink duty computation:

$$d_1 = \max(C'+M', C'+Y', M'+Y')$$

where $$\begin{bmatrix} C' \\ M' \\ Y' \end{bmatrix} = \begin{bmatrix} sC - U \\ sM - U \\ sY - U \end{bmatrix}.$$

Indeed, the same approach could be used for the single-ink-limit operation, with $d_1R = \max(C', M', Y')$. But we prefer to use a constant component-ratio value $s_1$ equal to the single-ink-duty limit $l_1$ instead, so we require no such operation.

Once the printer driver has performed the several ink-limiting operations, it applies the resultant values to its undercolor-removal operation. It converts the resultant multi-bit values to binary values, i.e., simply ink or no-ink, by way of FIG. 3's half-toning process 44. From the results it generates printer commands.

As is well known, the half-toning process can take many forms. Ordered dither associates different thresholds with different pixels to be printed and generates as the binary output value the result of comparing the component value with the threshold. Higher component values exceed more pixels' thresholds than lower component values do and thus result in more ink dots. Another type of half-toning is error diffusion, which typically (although not necessarily) employs a uniform threshold but adds a given pixel's resultant quantization error to neighboring pixels' values before threshold comparison. Its results are roughly similar ordered dither's.

Figure 11:
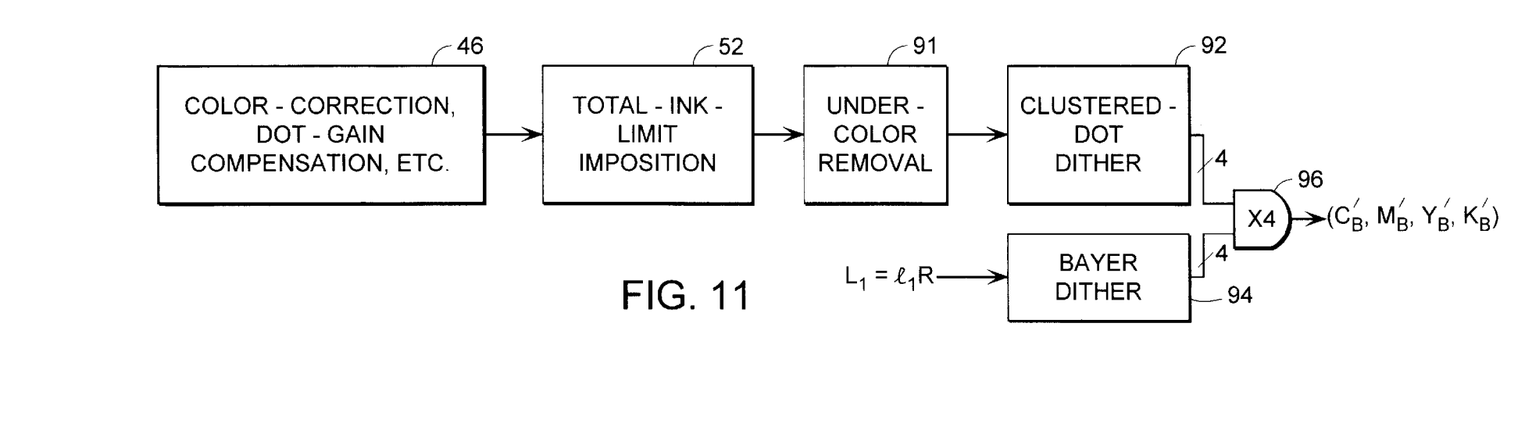
FIG. 11 is an image-revision-sequence block diagram that depicts some embodiments' half-toning operation in particular detail.

One or more of the ink-limiting operations can be embodied in the half-toning operation itself. FIG. 11 depicts one way to do this for the single-ink-limiting operation. We have omitted the two-ink-limiting operation from FIG. 11 because that operation is the least common, but its absence is not a necessary feature of a system that uses half-toning to impose an ink-duty-cycle limit. Nor is the inclusion of a total-ink-limiting operation 52 or an undercolor removal process 91.

In general, all that is required is that the image-revision sequence's results be applied to a half-toning process such as a clustered-dot-dither operation 92. As was just explained, this converts the multi-bit-resolution input component into single-bit indications of whether an ink dot of the associated color should be deposited at the current pixel. In the illustrated embodiment, which includes the undercolor-removal step 91, the input to the clustered-dot-dither process is four components for each pixel, namely, cyan, magenta, yellow, and black. In other embodiments, the inputs can be values for cyan, magenta, and yellow only. Indeed, the broader aspects of the invention can be employed in single-component-only (gray-scale) arrangements.

In any event, the printer driver modifies the dither process 92's output to impose a single-ink-duty limit by ANDing that output with the output of a second half-toning operation 94. A four-AND-gate symbol 96 represents this operation, although most embodiments will not employ dedicated gate circuits. To impose a single-ink limit $l_1$, the second half-toning operation 94 receives as its input a constant value $L_1 = l_1 R$, i.e., the product of the single-ink duty limit and the dither-threshold range R. In the illustrated embodiment, half-toning process 94 employs a Bayer dither matrix, but other dispersed-dot dithering processes could also work, as would error-diffusion-type half-toning. In principle, a clustered-dot-dither matrix could be employed, too, although we believe the results would not be nearly as good.

Since the result of dithering operation 94 is an "on" value for only $L_1$ out of every R pixels, all components' dot frequencies are reduced to $l_1$ times the frequencies with which they would have been deposited in the absence of the gating operation 96: the printer observes the single-ink limit $l_1$.

We prefer to generate the gating signals for different components by using different Bayer matrices. In particular, to produce the gating signal for magenta ink, we use a Bayer matrix whose threshold values are the additive inverses of those in the Bayer matrix used to produce the cyan gating signal. This reduces the number of pixels from which cyan and magenta dots are both "removed." The attendant white spots therefore occur less frequently than they would with a common gating signal, and a smoother visual impression results. Using complementary clustered-dot-dither matrices for those colors in operation 92 also yields a smoother effect.

But the present invention does not require using separate matrices to generate separate gating signals for different components; the second half-toning operation 94 performed for each component value can be a common operation performed for all of a pixel's component values to produce a common gating signal. Indeed, that operation can be performed in common for many pixels, since the, say, 8×8 Bayer dither matrix "tiles" the output image, and the second-half-toning-process thresholds' comparisons with the constant range-normalized limit $L_1$ can be performed in common for all pixels associated with the same dither-matrix threshold.

Since the gating reduces all components' ink duties, limit-imposition operations that precede it can relax their requirements correspondingly. Instead of having the total-ink-duty-ratio plot break at $\alpha L_{tot}$, as it does in FIG. 7, it can break at $\alpha L_{tot}/l_1$ instead, as FIG. 12 illustrates.

Figure 13:
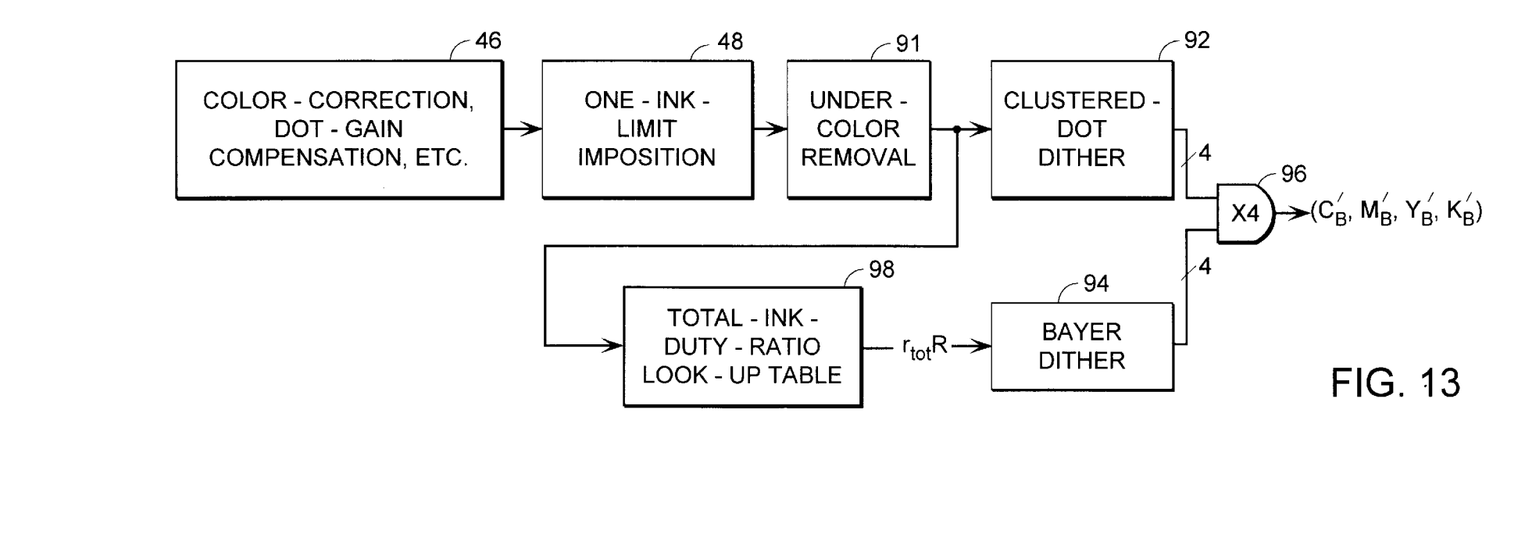
FIG. 13 is a block diagram of the image-revision sequence used in some of the present invention's embodiments.

The basic principle that the FIG. 11 embodiment employs can be extended to imposition of other ink-duty limits. In FIG. 11, the level applied to the ink-duty-limiting dithering process 94 is simply proportional to the ink-duty limit to be imposed, because the duty-limiting strategy in that embodiment is intended to be the rough equivalent of the first one-ink-limiting operation described above, in which all component values are simply multiplied by the ink duty limit, no matter how light the unadjusted color is. But the other ink-limiting operations described above reduce only darker colors' component values. FIG. 13 exemplifies the use of a dither matrix to impose an ink-duty limit in that fashion.

Figure 14:
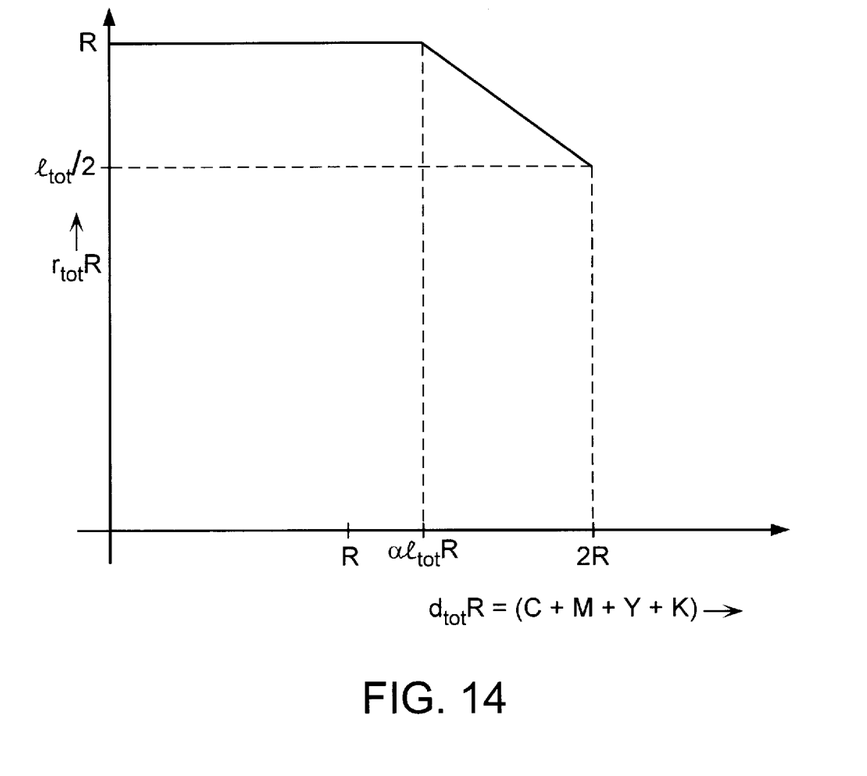
FIG. 14 is an ink-duty-ratio plot that characterizes the total-ink-limiting step in the embodiments of FIG. 13.

For the sake of example, we have arbitrarily chosen a system that imposes only one-ink and total-ink limits and that uses the dither-matrix approach only for the latter. So the one-ink-limiting operation 48 of FIG. 13 replaces the total-ink-limiting operation 52 of FIG. 11 in the image-revision sequence that precedes the clustered-dot-dither step 92. And since in this embodiment the duty ratio is not constant but instead is a function of the unadjusted color, the FIG. 13 embodiment includes a table-look-up step 98 that determines the ratio $r_{tot}$ of the total-ink-limit operation's output ink duty as a function of the unadjusted component values. FIG. 13 depicts this table-look-up operation's input as the undercolor-removal operation 91's output, because the resultant input ink duty, by which the look-up table is addressed, then is simply proportional to the sum of operation 91's output cyan, magenta, yellow, and black values. The look-up table implements a function such as that of FIG. 14, and the table output $r_{tot}R$ is the input to the ink-limit-imposing dither operation 94.

Figure 15:
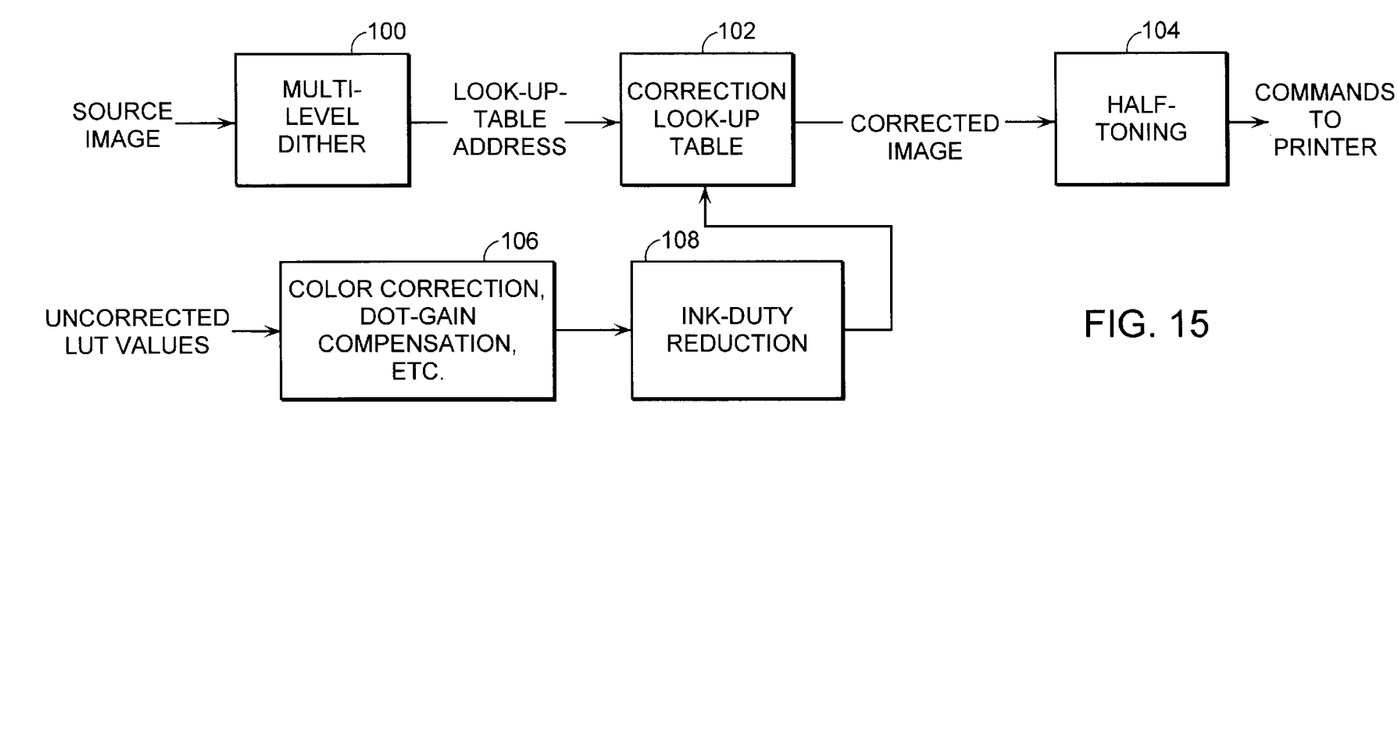
FIG. 15 is a block diagram that depicts an image-revision sequence that can be employed in some of the present invention's embodiments.

Although the foregoing discussion describes the various operations of color correction, dot-gain compensation, and ink-duty-cycle reduction as being performed separately for each incoming value, those skilled in the art will recognize that real-time operation can be expedited by combining many of these features in a manner that in a sense is "off line." FIG. 15 exemplifies this alternative approach.

To give a further idea of the wide range of embodiments in which the present invention can be practiced, FIG. 15 depicts a multi-level dithering operation 100 in the image-revision sequence to which the source image is applied. Such an operation is described in more detail in commonly assigned U.S. patent application Ser. No. 08/607,074, filed on Feb. 26, 1996, by Shu et al. for Generating Color-Correction Look-Up-Table Addresses by Multi-Level Half-Toning, which we hereby incorporate by reference. That operation's purpose is to reduce the component-value resolution of the source image so that a look-up table addressed by those component values in a table-look-up operation 102 can be restricted to a manageable size. For instance, the multi-level-dither step 100 could reduce the twenty-four bits per pixel of an eight-bit-per-component source image to, say, a fifteen-bit look-up-table address.

By the single real-time table-look-up operation 102, the printer driver performs color-fidelity correction, dot-gain compensation, and any ink-duty limiting not performed in a subsequent half-toning step 104. This results because the look-up table has been filled in an off-line operation that blocks 106 and 108 represent. Specifically, a revision sequence 106 that performs color-fidelity correction, dot-gain compensation, and possibly some other adjustment processes receives pixel values corresponding to all fifteen-bit look-up-table addresses that the multi-level-dithering operation 100 could potentially produce. The driver subjects the results to an ink-duty-reduction operation 108 that performs one or more of the ink-duty-reduction operations described above. The look-up table is filled with the resultant eight-bit-per-component values before any real-time source-image processing begins. The half-toning operation 104, which may include gating with a half-toning-operation-generated gating signal in the manner described above, generates outputs included in the printer commands.

It is apparent from the foregoing discussion that the present invention can be implemented in a wide range of embodiments to impose ink-duty limitations of many kinds. It thus constitutes a significant advance in the art.

We claim:

1. For employing an ink-jet printing mechanism to print an output image in response to receipt of input image signals representing, as the values of pixels of which an input image consists, input pixel values that represent respective unadjusted ink duties, the input ink duty represented by at least one input pixel value exceeding a predetermined ink-duty limit, a method comprising the steps of:

A) determining ink-duty ratios of respective reduced ink duties to the input pixel values' un adjusted ink duties, the r educed ink duties being a function of the input pixel values' unadjusted ink duties that (i) increases within at least an interval of unadjusted ink duties that exceed the predetermined ink-duty limit but (ii) does not itself exceed the predetermined ink-duty limit;

B) performing a command-generating operation in which printer-command signals to be applied to the printing mechanism are generated from the input image signals, the command-generating operation including an ink-duty-reduction operation that generates printer-command signals that when applied to the printing mechanism cause the printing mechanism to operate with output ink duties that bear the ink-duty ratios to output ink duties that the printing mechanism would produce in the absence of the ink-duty-reduction operation; and C) operating the printing mechanism by applying the print-command signals thereto.

2. A method as defined in claim 1 wherein:

A) the ink-jet-printing mechanism applies at least cyan, magenta, and yellow inks with respective constituent ink duties; and B) the ink-duty ratio is the ratio that the greatest of the constituent ink duties bears to the greatest of the constituent ink duties that the printing mechanism would produce in the absence of the ink-duty-reduction operation.

3. A method as defined in claim 1 wherein the ink-duty ratio is the same for all input pixel values.

4. A method as defined in claim 1 wherein the ink-duty ratios determined for input pixel values representing relatively low ink duties are unity, and the ink-duty ratios determined for pixel values representing relatively high ink duties are less than unity.

5. A method as defined in claim 1 wherein each pixel value consists of a plurality of component values representing respective constituent ink duties of respective-colored inks, and the unadjusted ink duty is that pixel value's highest constituent ink duty.

6. A method as defined in claim 5 wherein the ink-duty ratio is the same for all input pixel values.

7. A method as defined in claim 1 wherein each pixel value consists of a plurality of component values representing respective constituent ink duties of respective-colored inks, and the unadjusted ink duty is the highest sum of two of that pixel value's constituent ink duties.

8. A method as defined in claim 7 wherein the ink-duty ratios determined for input pixel values representing relatively low ink duties are unity, and the ink-duty ratios determined for pixel values representing relatively high ink duties are less than unity.

9. A method as defined in claim 1 wherein each pixel value consists of a plurality of component values representing respective constituent ink duties of respective-colored inks, and the unadjusted ink duty is the total of those constituent ink duties.

10. A method as defined in claim 9 wherein the ink-duty ratios determined for input pixel values representing relatively low ink duties are unity, and ink-duty ratios determined for pixel values representing relatively high ink duties are less than unity.

11. For employing an ink-jet printing mechanism to print an output image in response to receipt of input image signals representing, as the values of pixels of which an input image consists, input pixel values that represent respective unadjusted ink duties, the input ink duty represented by at least one in put pixel value exceeding a predetermined ink-duty limit, an apparatus comprising:

A) ratio-determining circuitry responsive to the input image signals for determining ink-duty ratios of respective reduced ink duties to the input pixel values' unadjusted ink duties, the reduced ink duties being a function of the input pixel values' unadjusted ink duties that (i) increases within at least an interval of unadjusted ink duties that exceed the predetermined ink-duty limit but (ii) does not itself exceed the predetermined ink-duty limit;

B) command-generating circuitry for performing a command-generating operation in which printer-command signals to be applied to the printing mechanism are generated from the input image signals, the command-generating operation including an ink-duty-reduction operation that generates printer-command signals that when applied to the printing mechanism cause the printing mechanism to operate with output ink duties that bear the ink-duty ratios to output ink duties that the printing mechanism would produce in the absence of the ink-duty-reduction operation; and C) output circuitry for operating the printing mechanism by applying the print-command signals thereto.

12. An apparatus as defined in claim 11 wherein:

A) the ink-jet-printing mechanism applies at least cyan, magenta, and yellow inks with respective constituent ink duties; and B) the ink-duty ratio is the ratio that the greatest of the constituent ink duties bears to the greatest of the constituent ink duties that the printing mechanism would produce in the absence of the ink-duty-reduction operation.

13. An apparatus as defined in claim 11 wherein the ink-duty ratio is the same for all input pixel values.

14. An apparatus as defined in claim 11 wherein the ink-duty ratios determined for input pixel values representing relatively low ink duties are unity, and the ink-duty ratios determined for pixel values representing relatively high ink duties are less than unity.

15. An apparatus as defined in claim 11 wherein each pixel value consists of a plurality of component values representing respective constituent ink duties of respective-colored inks, and the unadjusted ink duty is that pixel value's highest constituent ink duty.

16. An apparatus as defined in claim 15 wherein the ink-duty ratio is the same for all input pixel values.

17. An apparatus as defined in claim 11 wherein each pixel value consists of a plurality of component values representing respective constituent ink duties of respective-colored inks, and the unadjusted ink duty is the highest sum of two of that pixel value's constituent ink duties.

18. An apparatus as defined in claim 17 wherein the ink-duty ratios determined for input pixel values representing relatively low ink duties are unity, and the ink-duty ratios determined for pixel values representing relatively high ink duties are less than unity.

19. An apparatus as defined in claim 11 wherein each pixel value consists of a plurality of component values representing respective constituent ink duties of respective-colored inks, and the unadjusted ink duty is the total of those constituent ink duties.

20. An apparatus as defined in claim 19 wherein the ink-duty ratios determined for input pixel values representing relatively low ink duties are unity, and ink-duty ratios determined for pixel values representing relatively high ink duties are less than unity.

21. For printing an image in response to receipt of input image signals representing, as the values of pixels of which an input image consists, input pixel values that represent respective unadjusted ink duties, the input ink duty represented by at least one input pixel value exceeding a predetermined ink-duty limit, an apparatus comprising:

A) an ink-jet printing mechanism operable by application of control signals thereto to print an output image;

B) ratio-determining circuitry responsive to the input image signals for determining ink-duty ratios of respective reduced ink duties to the input pixel values' unadjusted ink duties, the reduced ink duties being a function of the input pixel values' unadjusted ink duties that (i) increases within at least an interval of unadjusted ink duties that exceed the predetermined ink-duty limit but (ii) does not itself exceed the predetermined ink-duty limit;

C) command-generating circuitry for performing a command-generating operation in which printer-command signals to be applied to the printing mechanism are generated from the input image signals, the command-generating operation including an ink-duty-reduction operation that generates printer-command signals that when applied to the printing mechanism cause the printing mechanism to operate with output ink duties that bear the ink-duty ratios to output ink duties that the printing mechanism would produce in the absence of the ink-duty-reduction operation; and D) output circuitry for operating the printing mechanism by applying the print-command signals thereto.

22. An apparatus as defined in claim 21 wherein:

A) the ink-jet-printing mechanism applies at least cyan, magenta, and yellow inks with respective constituent ink duties; and B) the ink-duty ratio is the ratio that the greatest of the constituent ink duties bears to the greatest of the constituent ink duties that the printing mechanism would produce in the absence of the ink-duty-reduction operation.

23. An apparatus as defined in claim 21 wherein the ink-duty ratio is the same for all input pixel values.

24. An apparatus as defined in claim 21 wherein the ink-duty ratios determined for input pixel values representing relatively low ink duties are unity, and the ink-duty ratios determined for pixel values representing relatively high ink duties are less than unity.

25. An apparatus as defined in claim 21 wherein each pixel value consists of a plurality of component values representing respective constituent ink duties of respective-colored inks, and the unadjusted ink duty is that pixel value's highest constituent ink duty.

26. An apparatus as defined in claim 25 wherein the ink-duty ratio is the same for all input pixel values.

27. An apparatus as defined in claim 21 wherein each pixel value consists of a plurality of component values representing respective constituent ink duties of respective-colored inks, and the unadjusted ink duty is the highest sum of two of that pixel value's constituent ink duties.

28. An apparatus as defined in claim 27 wherein the ink-duty ratios determined for input pixel values representing relatively low ink duties are unity, and the ink-duty ratios determined for pixel values representing relatively high ink duties are less than unity.

29. An apparatus as defined in claim 21 wherein each pixel value consists of a plurality of component values representing respective constituent ink duties of respective-colored inks, and the unadjusted ink duty is the total of those constituent ink duties.

30. An apparatus as defined in claim 29 wherein the ink-duty ratios determined for input pixel values representing relatively low ink duties are unity, and ink-duty ratios determined for pixel values representing relatively high ink duties are less than unity.

31. A storage medium containing instructions readable by a computer to configure the computer to function as a printer driver for operating an ink-jet printing mechanism to print an output image in response to receipt of input image signals representing, as the values of pixels of which an input image consists, input pixel values that represent respective unadjusted ink duties, the input ink duty represented by at least one input pixel value exceeding a predetermined ink-duty limit, which printer driver comprises:

A) ratio-determining circuitry responsive to the input image signals for determining ink-duty ratios of respective reduced ink duties to the input pixel values' unadjusted ink duties, the reduced ink duties being a function of the input pixel values' unadjusted ink duties that (i) increases within at least an interval of unadjusted ink duties that exceed the predetermined ink-duty limit but (ii) does not itself exceed the predetermined ink-duty limit;

B) command-generating circuitry for performing a command-generating operation in which printer-command signals to be applied to the printing mechanism are generated from the input image signals, the command-generating operation including an ink-duty-reduction operation that generates printer-command signals that when applied to the printing mechanism cause the printing mechanism to operate with output ink duties that bear the ink-duty ratios to output ink duties that the printing mechanism would produce in the absence of the ink-duty-reduction operation; and C) output circuitry for operating the printing mechanism by applying the print-command signals thereto.

32. A storage medium as defined in claim 31 wherein:

A) the ink-jet-printing mechanism applies at least cyan, magenta, and yellow inks with respective constituent ink duties; and B) the ink-duty ratio is the ratio that the greatest of the constituent ink duties bears to the greatest of the constituent ink duties that the printing mechanism would produce in the absence of the ink-duty-reduction operation.

33. A storage medium as defined in claim 31 wherein the ink-duty ratio is the same for all input pixel values.

34. A storage medium as defined in claim 31 wherein the ink-duty ratios determined for input pixel values representing relatively low ink duties are unity, and the ink-duty ratios determined for pixel values representing relatively high ink duties are less than unity.

35. A storage medium as defined in claim 31 wherein each pixel value consists of a plurality of component values representing respective constituent ink duties of respective-colored inks, and the unadjusted ink duty is that pixel value's highest constituent ink duty.

36. A storage medium as defined in claim 35 wherein the ink-duty ratio is the same for all input pixel values.

37. A storage medium as defined in claim 31 wherein each pixel value consists of a plurality of component values representing respective constituent ink duties of respective-colored inks, and the unadjusted ink duty is the highest sum of two of that pixel value's constituent ink duties.

38. A storage medium as defined in claim 37 wherein the ink-duty ratios determined for input pixel values representing relatively low ink duties are unity, and the ink-duty ratios determined for pixel values representing relatively high ink duties are less than unity.

39. A storage medium as defined in claim 31 wherein each pixel value consists of a plurality of component values representing respective constituent ink duties of respective-colored inks, and the unadjusted ink duty is the total of those constituent ink duties.

40. A storage medium as defined in claim 39 wherein the ink-duty ratios determined for input pixel values representing relatively low ink duties are unity, and ink-duty ratios determined for pixel values representing relatively high ink duties are less than unity.

* * * * *

UNITED STATES PATENT AND TRADEMARK OFFICE
CERTIFICATE OF CORRECTION

PATENT NO. : 5,872,896
DATED : February 16, 1999
INVENTOR(S) : Joseph S. Shu, et al.

It is certified that error appears in the above-identified patent and that said Letters Patent is hereby corrected as shown below:

Column 10, line 52, change "un adjusted" to --unadjusted--.

line 53, change "r educed" to --reduced--.

Column 11, line 51, change "in put" to --input--.

Signed and Sealed this

Sixth Day of July, 1999

Attest:

Q. TODD DICKINSON

Attesting Officer     Acting Commissioner of Patents and Trademarks